United States Patent [19]

Chang

[11] Patent Number: 4,886,979

[45] Date of Patent: Dec. 12, 1989

[54] POWER SOURCE CIRCUIT DEVICE FOR MONITORS AND HOST COMPUTERS

[76] Inventor: San-Julie Chang, No. 5, Lane 359, Nei Hou Rd., Sec. 1, Taipei, Taiwan

[21] Appl. No.: 162,626

[22] Filed: Mar. 1, 1988

[51] Int. Cl.$^4$ ............................................. H02J 1/10
[52] U.S. Cl. ...................................... 307/11; 307/155; 363/13; 364/900
[58] Field of Search ................. 363/13, 146; 307/150, 307/11, 155, 156; 439/620

[56] References Cited

U.S. PATENT DOCUMENTS

| | | | |
|---|---|---|---|
| 2,721,946 | 10/1955 | Weisberger et al. | 363/13 |
| 2,771,559 | 11/1956 | Montmeat | 307/156 |
| 3,237,079 | 2/1966 | Mas | 307/150 |
| 4,323,787 | 4/1982 | Sato et al. | 307/155 |
| 4,525,802 | 6/1985 | Hackamack | 364/900 |
| 4,723,115 | 2/1988 | Apter | 439/620 |

FOREIGN PATENT DOCUMENTS 2456349  1/1981  France ................. 307/150

Primary Examiner—William H. Beha, Jr.
Attorney, Agent, or Firm—Sandler & Greenblum

[57] ABSTRACT

An improved power source device for monitors and host computers includes a first power source arrangement having a plug at one end and a capacitor parallel-connected at the other end which is electrically coupled with an internal circuit of a monitor for supplying a DC power to the monitor; and a second power source arrangement with a connecting component having input terminals electrically coupled with an internal switching power supply circuit of a host computer for obtaining a DC power therefrom, and output terminals connected to a socket fixed in a housing unit wall of the host computer; thereby, with the first and second power source arrangements connected together, DC power source will be directly supplied to the monitor from the host computer so as to eliminate any low-frequency and high-frequency interferences on the screen of the monitor. Additionally, with this simplified power source device, both the manufacturing cost and weight of the monitors are substantially reduced.

3 Claims, 2 Drawing Sheets

POWER SOURCE CIRCUIT DEVICE FOR MONITORS AND HOST COMPUTERS

BACKGROUND OF THE INVENTION

This invention relates to a power source circuit device for monitors and host computers and, more particularly, to an improved power source circuit device separately disposed in a monitor and an associated host computer from which the DC power source is directly supplied to the associated monitor so that frequently experienced interferences in the monitor are completely eliminated.

With the rapid development of computer science and information processing, monitors have become an increasingly demanded product the world over. Unlike television sets, with which a dynamic picture presented on the screen is usually used for recreational purposes, with the looker's eyes to be kept at a proper distance, computer monitors are used to view information presented on the screen and the user's eyes have to be kept at a close distance. Therefore, the information displayed on a monitor screen must be clear and stable; otherwise, it will pose a serious problem to the user's eyes. However, as conventional monitors are usually provided with a local power source circuit arrangement for being electrically connected to an external AC power source and obtaining a DC power therefrom, interference of a low-frequency magnetic field from a transformer disposed in the local power source circuit will affect the picture on the screen of the monitors, an example of this is the commonly encountered "water flowing ripple" interference, which is harmful to the user's eyes.

The above-mentioned monitors are shown in FIG. 1. Therein a known monitor MN1 is functionally connected to a host computer PC1 through a signal line SG1. The local power source circuit disposed in the monitor MN1 includes a step-down transformer T01 with its primary coil terminals respectively connected to the input terminals A1 and A2 which are adapted to be connected to an external AC power source, and with its secondary coil terminals separately coupled with a bridge rectifier D1 and a filtering capacitor C1 for providing required DC power supply to the monitor MN1. This known power source arrangement often suffers from low-frequency interference caused by both the magnetic field produced by the step-down transformer T01 and the synchroneous signals generated in perpendicular direction from the interface card within the monitor MN1. Consequently, "water flowing ripple" interference is present on the screen. Although certain measures have been taken to prevent this low-frequency interference problem, such as wrapping a silicon sheet around the transformer T01 for isolating the magnetic field thereof or changing the direction and location of the transformer T01, no significant improvement has been achieved by taking such steps.

Shown in FIG. 2 is another known monitor MN2 having its power source circuit arrangement disposed therein and electrically connected to a host computer PC2 through signal line SG2. As can be seen in FIG. 2, the external AC power source is input into a bridge rectifier D2 through input terminals B1 and B2, and rectified power is supplied to the transformer T02 and the base of transistor Q1 from which a high-frequency switching power supply is rectified and filtered before being fed into the monitor MN2. Although this high-frequency switching power supply has solved the low-frequency interference problem suffered by the prior art shown in FIG. 1, the harmonic waves generated along with the high frequency switching power supply of the power source circuit can hardly be eliminated therefrom. As a result, other kinds of interference, such as "snowing-like" high-frequency interference, often appear on the monitor screen. Of course, this kind of interference can be removed by improving the hardware design of the monitor; however, the manufacturing costs are increased by taking such steps.

SUMMARY OF THE INVENTION

It is therefore a primary object of this invention to provide an improved power source circuit device for monitors and host computers that overcomes the foregoing problems associated with the prior art.

This and other objects of the invention are achieved by providing an improved power source device for monitors and host computers both of which are normally connected together through signal lines. The power source device according to this invention comprises a first power source means having a plug at one end and a capacitor circuit parallel connected to the other end being disposed in a monitor for supplying a DC power thereto, and a second power source means having a connecting component at one end electrically connected to a switching power supply source of a host computer and a socket at the other end fixed in a housing unit of the host computer for being electrically connected with the plug of the first power source means so as to supply a switching DC power supply therefrom. Thereby, the switching DC power source from the host computer can be directly supplied to the associated monitor through the first power source means so that not only the interference in the monitor is eliminated, but also the weight and manufacturing cost of the monitor is decreased.

Other advantages and characteristics of the present invention will become apparent from the following detailed description of a preferred embodiment when read in conjunction with the accompanying drawings.

DETAILED DESCRIPTION OF THE PREFERRED EMBODIMENT

Figure 3:
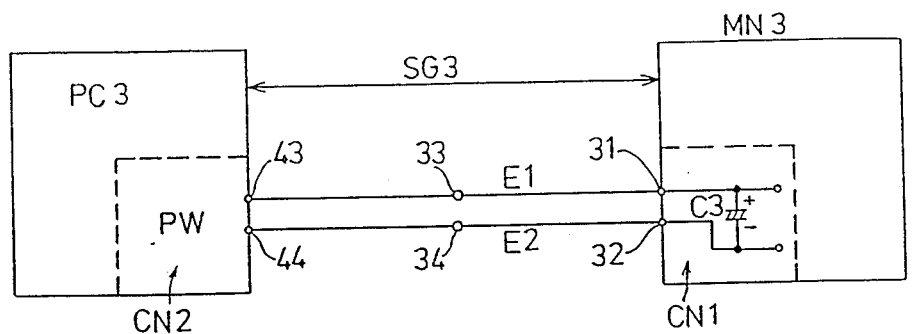
FIG. 3 is a schematic diagram of a preferred embodiment of an improved power source device disposed in a monitor and an associated host computer according to this invention.
Figure 4:
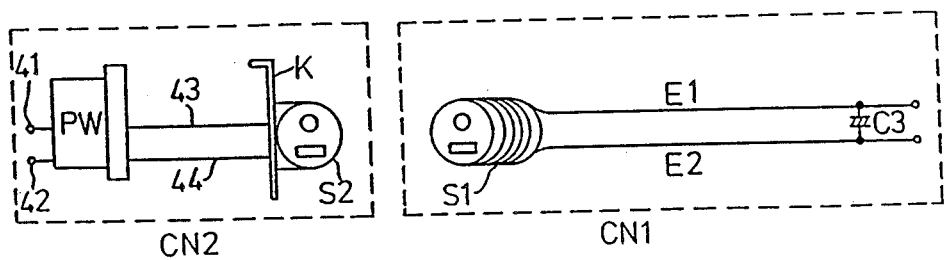
FIG. 4 is an illustrative view of the preferred embodiment shown in FIG. 3.

Referring to FIGS. 3 and 4, the preferred embodiment of an improved power source device according to this invention comprises a first power source means CN1 electrically disposed in a monitor MN3, which, as usual, is functionally coupled with a host computer PC3 through signal line SG3, and a second power source means CN2 electrically disposed in the host computer PC3 for being electrically connected with the first power source means CN1.

Figure 1:
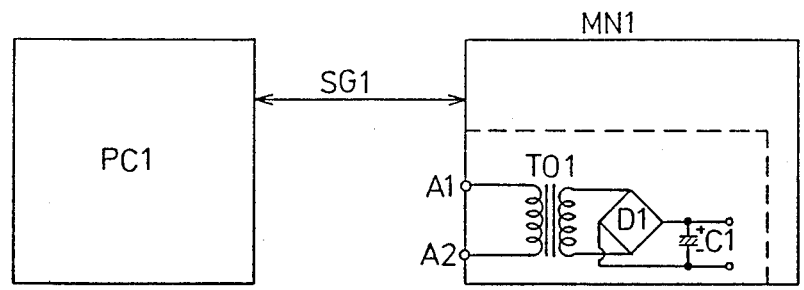
FIG. 1 is a known power source circuit diagram disposed in a monitor for being electrically connected to an external power supply.
Figure 2:
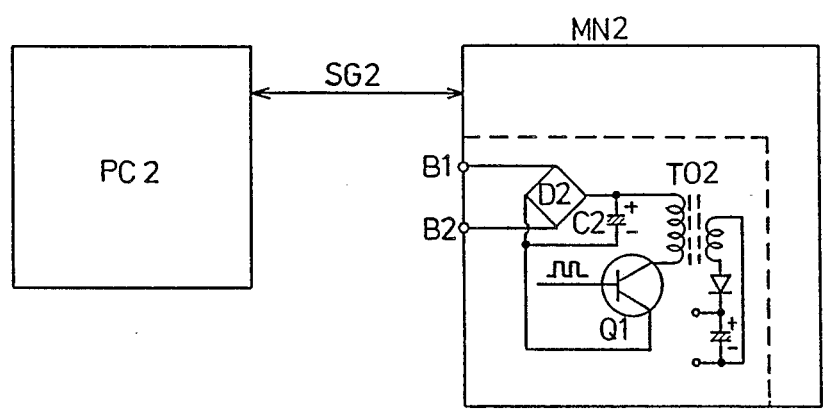
FIG. 2 is another known power source circuit diagram disposed in a monitor for being electrically connected to an external power supply.

The first power source means CN1 includes a pair of power lines E1 and E2 having output terminals 31 and 32 electrically coupled with the internal circuit (not shown) of the monitor MN3 (it is to be noted that the monitor referred to in the specification of this application belongs to the monochrome type of monitors) and input terminals 32 and 34 connected to a plug S1, and a capacitor C3 parallel-connected to the power lines E1 and E2 in the monitor MN3 for shunting any possible AC power coming from the power lines E1 and E2. It shall be appreciated that with the installation of the first power source means CN1, the original power source circuit (as shown in FIGS. 1 and 2) and the related components are substantially removed therefrom so that the manufacturing cost is decreased and the weight of the monitor is also reduced.

The second power source means CN2 includes a 4-pin connecting component PW disposed in the host computer PC3 (it is to be noted that the host computer referred to in the specification of this application belongs to the monochrome type of host computers) with output terminals 41 and 42 electrically connected to the internal switching power supply (not shown) available in the host computer PC3 (the internal switching power supply originally disposed in a computer is well known to those skilled in the art) and input terminals 43 and 44 connected to a socket S2, which is fixed in the housing unit of the host computer PC3 through a metal anchoring plate K (since this kind of electrical connection is well known to those skilled in the art, detailed description and illustration are omitted for brevity). By connecting the plug S1 to the socket S2, the DC power source will be directly supplied to the monitor MN3 from the host computer PC3. It shall be appreciated that, with the DC power source supplied from the host computer, the DC power level is stable, and no interruption or erroneous execution in data processing will occur as often is encountered in the monitors with a local power source derived from an external AC power supply. In addition, as the switching power supply in the host computer is usually disposed at a position far away from the housing unit wall of the host computer and with the housing unit wall serving as an isolating object, interferences which might be caused from the switching power supply of the host computer are completely eliminated, and the picture displayed on the monitor screen will be much clearer.

It shall be appreciated that the power lines E1 and E2 can directly connect the input terminals 33, 34 of the capacitor circuit C3 and 43, 44 of the connecting component PW without requiring plug S1 and socket S2. In addition, the power lines E1 and E2 can be either a separated electrical line or a coaxial cable, depending on the manufacturing cost considerations. As to the line connection between the first power source means CN1 and the second power source means CN2, no color code consideration (negative and positive identification) for the power lines E1 and E2 is necessary since the power lines E1 and E2 can be alternatively connected to the input terminals 43 and 44 of the second power source means CN2. On the other hand, if a bridge rectifyer is used at the output end of the power lines E1 and E2, the power lines designed for identifying negative and positive lines must be color coded.

While a preferred embodiment has been illustrated and described, it will be apparent that many changes may be made in the general construction and arrangement of the invention without departing from the scope thereof, and it is therefore desired that the invention not be limited to the exact disclosure, but only to the extent of the appended claims.

What is claimed is:

1. A power source device for a monochrome monitor and a monochrome host computer, said monitor and said host computer adapted to be functionally interconnected by signal lines, said monitor having DC powered internal circuitry, said host computer having a switching power supply circuit and a housing unit wall, said power source device comprising:
    (a) a first power source means comprising:
        (i) output terminals disposed in said monitor and electrically connected to said DC powered internal circuitry,
        (ii) input terminals,
        (iii) connecting means coupled to said input terminals, and
        (iv) power lines associated with said connecting means for making a power connection to said connecting means; and
    (b) a second power source means comprising:
        (i) output terminals disposed in said host computer and electrically connected to said switching power supply circuit, and
        (ii) a socket fixed in said housing unit wall, said socket being adaptable to be connected to said connecting means;
    whereby DC power derived from said second power source means can be directly supplied to said monitor through said first power supply means so as to eliminate low-frequency and high-frequency interference with respect to said monitor and, further, to substantially reduce the manufacturing cost and weight of said monitor.

2. A power source device as recited in claim 1, wherein said first power source means further comprises a two-pin plug and a capacitor; wherein said power lines are a pair of power lines having output terminals and input terminals, said output terminals coupled to said DC powered internal circuitry, said input terminals connected to said two-pin plug for supplying DC power to said internal circuitry of said monitor from said pair of power lines; and wherein said capacitor is parallel-connected to said pair of power lines within said monitor for shunting any possible AC power coming from said pair of power lines.

3. A power source device as recited in claim 1, wherein said second power source means further comprises a 4-pin connecting component having output terminals and input terminals, said input terminals connected to said socket fixed in said housing unit wall of said host computer through an anchoring plate, said output terminals electrically coupled with said internal switching power supply circuit of said host computer; and wherein said first power source means further comprises a plug
    whereby with said plug of said first power source means connected to said socket of said second power source means, DC power from said host computer can be steadily supplied to said monitor without suffering any high-frequency or low-frequency interferences.

* * * * *